United States Patent [19]

Virtanen et al.

[11] Patent Number: 4,749,054
[45] Date of Patent: Jun. 7, 1988

[54] METHOD FOR MEASURING THE QUANTITY OF A DRIED PRODUCT

[75] Inventors: Markku Virtanen, Savonlinna; Seppo Reijonen, Kerimäki, both of Finland

[73] Assignee: Outokumpu Oy, Helsinki, Finland

[21] Appl. No.: 916,501

[22] PCT Filed: Feb. 20, 1986

[86] PCT No.: PCT/FI86/00020
§ 371 Date: Oct. 8, 1986
§ 102(e) Date: Oct. 8, 1986

[87] PCT Pub. No.: WO86/04985
PCT Pub. Date: Aug. 28, 1986

[30] Foreign Application Priority Data

Feb. 22, 1985 [FI] Finland .................................. 850728

[51] Int. Cl.⁴ ..................... G01G 13/14; G01G 23/00; G01N 25/56
[52] U.S. Cl. ........................................ 177/1; 177/165; 177/245; 73/76; 364/568
[58] Field of Search .................. 177/25.13, 25.14, 245, 177/1, 165; 364/568; 73/76

[56] References Cited

U.S. PATENT DOCUMENTS

| 3,909,598 | 9/1975 | Collins et al. | 177/25.14 X |
| 4,106,329 | 8/1978 | Takahashi et al. | 177/245 X |
| 4,137,976 | 2/1979 | Grayson, Jr. | 177/25.19 X |
| 4,295,537 | 10/1981 | McAvinn et al. | 177/165 X |
| 4,354,244 | 10/1982 | Miller et al. | 364/568 X |
| 4,448,272 | 5/1984 | Keller et al. | 177/25.19 X |
| 4,562,044 | 12/1985 | Bohl | 177/145 X |
| 4,666,007 | 5/1987 | Knothe et al. | 177/245 |

Primary Examiner—George H. Miller, Jr.
Attorney, Agent, or Firm—Dellett, Smith-Hill and Bedell

[57] ABSTRACT

The invention is related to a method for measuring the quantity of a dried product, particularly that of a concentrate dried in a pressure filter. The method comprises the following stages: inserting (1) the product to be dried in the drying apparatus, carrying out the drying (1,2,3) and discharging (5) the dried product from the drying apparatus. In order to define the exact quantity of the dried product, the whole drying apparatus is weighed (4) both before discharging the dried product and immediately thereafter. The weighing results are processed in a microprocessor. By means of history recordings of the weighing results, the drying process itself can also be optimized.

5 Claims, 1 Drawing Sheet

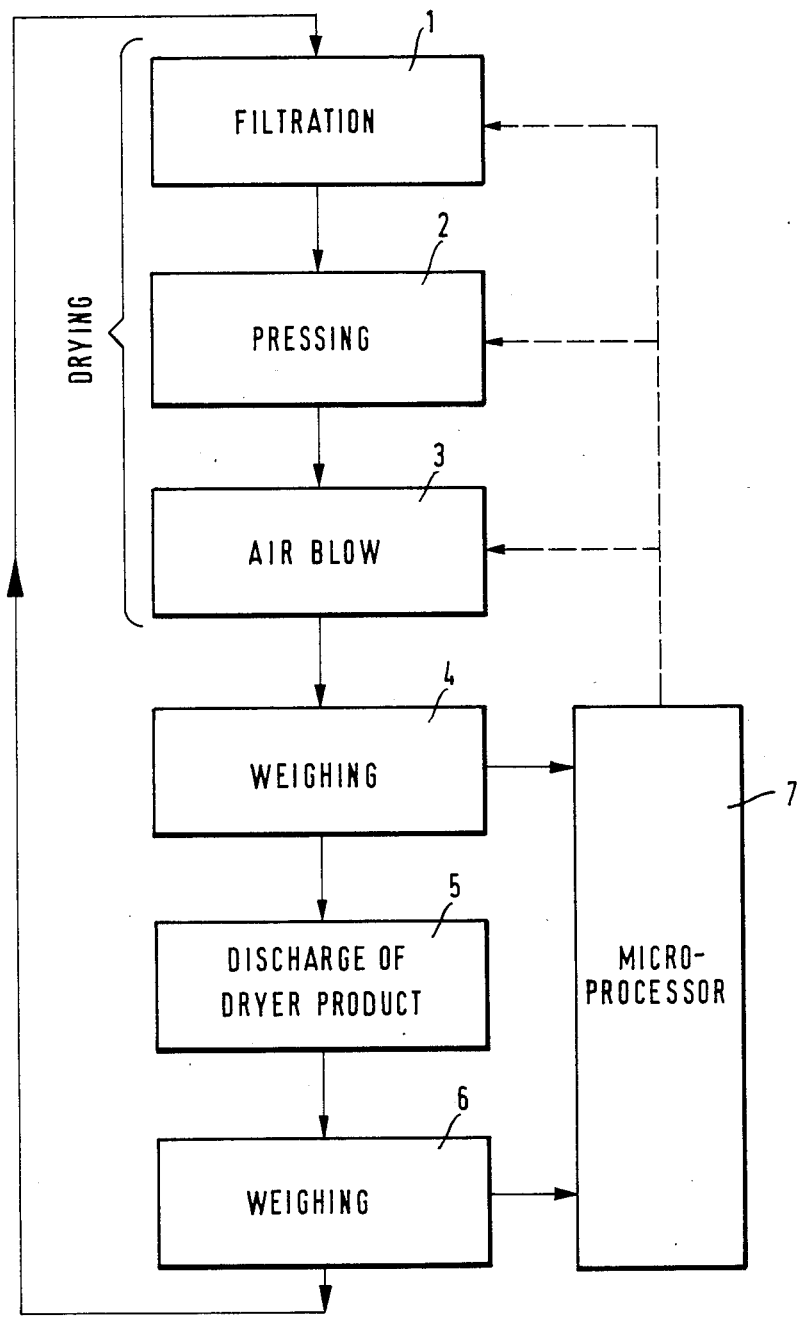

METHOD FOR MEASURING THE QUANTITY OF A DRIED PRODUCT

The present invention relates to a method for measuring the quantity of the periodically dried product, and particularly the quantity of a concentrate dried in a pressure filter. The method comprises the following, periodically repeated stages: inserting the product to be dried in the drying apparatus, carrying out the successive drying stages, and discharging the dried product from the drying apparatus.

The present invention is particularly well suited to be employed in connection with concentrate drying, but naturally its scope is not limited to this one exemplary case only.

Such pressure filters that are suited for drying conentrates are manufactured for example by Larox Oy. When drying a concentrate in this type of a pressure filter, problems arise, on one hand as regards the accuracy when measuring the quantity of the conentrate, and on the other hand as regards the optimal adjusting of the drying operation. This is mainly due to the periodical nature of the operation of the pressure filter.

Generally the drying operation consists of three stages. During the filtering stage, the slurry is conducted through the filter cloth, so that the cloth separates the solid particles of concentrate from the slurry. After filtration, the slurry flow is interrupted, and the layer of concentrate formed on the filter cloth is squeezed in order to reduce the volume of the filter cake and to remove liquid therefrom. After squeezing, the filter cake is further dried by blowing air through the cake. Thereafter the filter cake is discharged from the pressure filter. The dried concentrate is further transported, preferably by means of a belt conveyor, to the desired location.

A customary method for measuring the concentrate quantity during transport in the belt conveyor is to employ a belt weigher. The belt weigher, however, does not function accurately enough owing to the periodical nature of the operation of the pressure filter.

In order to avoid this drawback, the present invention is characterized by the novel features presented in the patent claims. By employing the method of the invention, the concentrate quantity can be measured quickly and accurately and without interfering with the process itself. The capacity of the above described pressure filter is dependent on the length of the respective filtering, squeezing, air-blow drying and discharge stages. The method of the invention also makes it possible to run the pressure filter at optimum readings, in which case the capacity of the pressure filter is utilized more efficiently.

In the following, the invention is explained in more detail with reference to the appended drawing, which is a diagrammatic illustration of an advantageous application of the method of the invention.

The diagram of the drawing illustrates the drying of concentrate by employing a pressure filter manufactured by Larox Oy, and to be more precise, it illustrates one drying cycle of the pressure filter. The drying of the concentrate is started in the filtering stage 1, where the concentrate, in liquid suspension, is filtered by means of the filter cloth. In practice the length of the filtering stage may vary accoridng to the material to be filtered. As an example, the chosen filtering time may be a minute.

After filtration, the concentrate flow is interrupted, and the layer of concentrate which is accumulated on the filter cloth undergoes the squeezing stage 2. Squeezing is carried out by means of a rubber film and by utilizing liquid pressure. In practice the length of the squeezing stage may vary as well, and it can be for instance a minute.

After squeezing, the filter cake undergoes air-blow drying 3. The length of the air-blow drying stage is dependent on the qualities of the material in question, but in practice a suitable duration is for example five minutes.

After air-blow drying, the drying phase proper is completed, and the filter cake is ready to be discharged from the press. Before discharging, however, the whole press is weighed along with the concentrate contained therein. The weighing 4 is best carried out so that the press apparatus is attached on top of suitable square beams which are for instance 100 mm high. The said beams are provided with measuring sensors, which may be for instance piezoelectric weighing sensors of the commercially available type. They are manufactured for instance by Kouvo Automation under the trademark Micro-cell. From the transmitters of the said sensors there is received an electric signal between 4–20 mA which is dependent on the mass. The obtained weighing result is recorded in a process computer or in a special microprocessor 7.

After weighing, the concentrate is discharged, 5, from the press. The obtained concentrate is further transported to the desired location by means of a belt conveyor. In practice the duration of the discharge stage is 10–12 seconds. Immediately before starting a new filtering stage, a new weighing 6 of the press is carried out. The weighing result is again recorded in the microprocessor 7. The microprocessor carries out the subtraction of the two readings, and the obtained result is the weight of the batch in question.

The above described operations are carried out repeatedly. The microprocessor records the reading fed therein, and thus the concentrate quantities are accessible in the desired form and stage. The most remarkable advantage of the invention is that by means of the history recording, the pressure filter may be adjusted to function exactly at the desired optimum readings. This in turn has a direct influence in the capacity of the filter press, and consequently the method of the invention is of considerable economic importance.

In the above specification, the invention has been explained with reference to one advantageous application only. The invention is not, however, exclusively restricted to the said example, but it can be largely modified within the scope of the following patent claims.

What is claimed is:

1. A method for measuring the quantity of a dried product, particularly the quantity of concentrate dried in a pressure filter, comprising:
   (a) introducing the product to be dried into drying apparatus,
   (b) drying the product in the apparatus,
   (c) weighing the dried product in the drying apparatus,
   (d) discharging the dried product from the drying apparatus, and
   (e) weighing the drying apparatus after discharging the dried product, whereby the difference obtained between the mass determined in step (e) and the mass determined in step (c) represents the mass of the dried product that was discharged from the drying apparatus.

2. A method according to claim 1, comprising discharging the dried product onto a belt conveyor and transporting the dried product from the drying apparatus on the belt conveyor.

3. A method for measuring the quantity of a dried product, particularly the quantity of concentrate dried in a pressure filter, comprising:
  (a) providing the product to be dried in successive batches,
  (b) introducing a batch of the product to be dried into drying apparatus,
  (c) drying the batch of product in the apparatus,
  (d) weighing drying apparatus containing the batch of dried product,
  (e) discharging the batch of dried product from the drying apparatus,
  (f) weighing the drying apparatus after discharging the batch of dried product,
  (g) subtracting the mass determined in step (f) from the mass determined in step (d), and
  (h) repeating steps (b) through (g) for other batches of the product.

4. A method according to claim 3, comprising discharging the batches of dried product onto a belt conveyor and transporting the batches of dried product from the drying apparatus on the belt conveyor.

5. A method according to claim 3, comprising storing the value determined in the step (g) for each batch and utilizing the stored values for adjusting the drying process.

* * * * *